(12) United States Patent
Aydin et al.

(10) Patent No.: US 11,300,338 B2
(45) Date of Patent: Apr. 12, 2022

(54) METHOD AND DEVICE FOR PROVIDING ZEOTROPIC REFRIGERANTS

(71) Applicant: WEISS UMWELTTECHNIK GMBH, Reiskirchen (DE)

(72) Inventors: Murat Aydin, Bremen (DE); Gerald Klee, Muecke (DE)

(73) Assignee: WEISS TECHNIK GMBH, Reiskirchen (DE)

( * ) Notice: Subject to any disclaimer, the term of this patent is extended or adjusted under 35 U.S.C. 154(b) by 208 days.

(21) Appl. No.: 16/595,790

(22) Filed: Oct. 8, 2019

(65) Prior Publication Data
US 2020/0109885 A1 Apr. 9, 2020

(30) Foreign Application Priority Data
Oct. 9, 2018 (EP) .................................. 18199223

(51) Int. Cl.
*F25B 45/00* (2006.01)
*G05D 11/13* (2006.01)
*F28F 23/02* (2006.01)

(52) U.S. Cl.
CPC ............. *F25B 45/00* (2013.01); *F28F 23/02* (2013.01); *G05D 11/132* (2013.01); *F25B 2345/001* (2013.01); *F25B 2345/003* (2013.01); *F25B 2345/006* (2013.01)

(58) Field of Classification Search
CPC ............... F25B 45/00; F25B 2345/001; F25B 2345/003; F28F 23/02; G05D 11/132
See application file for complete search history.

(56) References Cited

U.S. PATENT DOCUMENTS

| 5,709,093 A | 1/1998 | Cerri et al. | |
| 6,237,348 B1* | 5/2001 | Ide | F17C 5/02 62/50.1 |
| 9,857,111 B2* | 1/2018 | McMasters | F25B 45/00 |

FOREIGN PATENT DOCUMENTS

| EP | 1008799 A1 | 6/2000 | |
| JP | 2001141193 A * | 5/2001 | |
| JP | 2001141193 A | 5/2001 | |
| WO | 9844288 A1 | 10/1998 | |
| WO | 02084168 A1 | 10/2002 | |
| WO | WO-2017157864 A1 * | 9/2017 | F25B 9/008 |

\* cited by examiner

*Primary Examiner* — Ana M Vazquez
(74) *Attorney, Agent, or Firm* — Quarles & Brady LLP

(57) ABSTRACT

The disclosure relates to a method and a device for providing zeotropic refrigerants in which the refrigerant is formed from a refrigerant blend of at least two components, the components being added to a container in the ratio of their respective mass fractions to the refrigerant, and the refrigerant blend being formed in the container, wherein the temperature and/or the pressure in the container is set by means of a control device such that the refrigerant is present exclusively in the gas phase or exclusively in the liquid phase.

19 Claims, 1 Drawing Sheet

METHOD AND DEVICE FOR PROVIDING ZEOTROPIC REFRIGERANTS

CROSS-REFERENCE TO RELATED APPLICATIONS

This application claims priority to European Patent Application No. 18199223.1, filed Oct. 9, 2018, the disclosures of which is incorporated by reference here in it's entirety for all purposes.

BACKGROUND

The disclosure relates to a method and a device for providing zeotropic refrigerants in which the refrigerant is formed from a refrigerant blend of at least two components, the components being added to a container in the ratio of their respective mass fractions to the refrigerant, and the refrigerant blend being formed in the container.

Refrigerants generally circulate within a closed cooling circuit of refrigeration machines and successively undergo various changes in phase. Refrigerants should be designed such that they can be used within a predefined temperature difference in a cooling circuit. What are known as single-component refrigerants and also refrigerant blends of at least two or more substances are known from the prior art. The refrigerant is named in accordance with DIN 8960, paragraph 6.

To meet legal requirements, a refrigerant must not contribute substantially to ozone degradation in the atmosphere or to global warming. Furthermore, a refrigerant should not be combustible, inter alia to avoid making filling, dispatch and operation of a cooling circuit more difficult owing to any safety regulations which must be followed. In this case, combustibility means the property of the refrigerant to react with ambient oxygen, releasing heat. A refrigerant is combustible in particular if it falls within fire class C according to European Standard EN2 or DIN 378 classes A2, A2L and A3.

Furthermore, a refrigerant should have a relatively low $CO_2$ equivalent, i.e. a relative greenhouse potential or else global warming potential (GWP) should be as low as possible to avoid indirect damage to the environment by the refrigerant when it is released. The GWP indicates how much a defined mass of a greenhouse gas contributes to global warming, with carbon dioxide used as the comparative value. The value describes the average warming effect over a certain period; in this case 20 years are defined for comparability. For the definition of the relative $CO_2$ equivalent and GWP, reference is made to the fifth Assessment Report of the Intergovernmental Panel on Climate Change (IPCC), Appendix 8.A, Table 8.A.1.

Azeotropic refrigerant blends behave like pure substances with constant properties, i.e. a dew point curve and a bubble point curve of an azeotropic refrigerant blend touch at least at one point, so that the composition of the azeotropic refrigerant blend is always the same in a gas phase or a liquid phase. With a zeotropic refrigerant blend, a phase transition takes place over a temperature range, what is known as temperature glide. Temperature glide is regarded as a difference between the boiling temperature and the dew point temperature at constant pressure. With a zeotropic refrigerant blend, therefore, a dew point curve and a bubble point curve do not touch at any point, and therefore there is between the dew point curve and the bubble point curve a state space in which the refrigerant blend is not present in a stable state. This state space is also referred to as a miscibility gap. Here, the refrigerant blend demixes into at least two different phases with different compositions. A liquid phase can thus contain a higher concentration of the low-boiling substances of the refrigerant blend. If a refrigerant blend stored in a container is then removed from same, there is always a change in the concentration of the refrigerant blend if this removal is made from the liquid phase or the gas phase. Therefore, as a container fill level falls, the composition of the refrigerant blend changes in the gas phase and in the liquid phase. This change in the composition can mean that the composition of the refrigerant blend no longer corresponds to the composition of the refrigerant blend originally added. This problem regularly occurs in the storage of liquefied gases in refrigeration technology.

WO 02/084168 A1 describes a method for storing liquefied gases in a container. As soon as a composition changes as a result of demixing on removal from the container, a component of the blend is added subsequently to restore the desired composition. A substance blend can thus be provided within a certain tolerance.

SUMMARY

The present disclosure therefore addresses the problem of proposing a method and a device for providing zeotropic refrigerants, with which a comparatively precise blend composition can be achieved during removal from a container.

This problem is solved by a method having the features of Claim 1, a device having the features of Claim 10, and a refrigeration machine having the features of Claim 20.

In the method according to the disclosure for providing zeotropic refrigerants, the refrigerant is formed of a refrigerant blend of at least two components, the components being added to a container in the ratio of their respective mass fractions to the refrigerant, and the refrigerant blend being formed in the container, wherein a temperature and/or a pressure in the container is set by means of a control device such that the refrigerant is present exclusively in the gas phase or exclusively in the liquid phase.

Accordingly, the control device ensures that the temperature and/or the pressure in the container is always controlled such that the refrigerant is present completely either in the gas phase or in the liquid phase, bypassing the specific miscibility gap of the refrigerant. The refrigerant can then be removed from the container either in the gas phase or the liquid phase without a change occurring in the concentration of the at least two components of the refrigerant blend inside the container. It is then also no longer necessary to add a component subsequently and with extra effort, and a much more precise blend composition of the refrigerant can be achieved on removal from the container. The refrigerant can in principle be produced in the container by adding the at least two components to the container and storing them in the container.

The concentration of the components of which the refrigerant blend consists can therefore remain constant during removal of refrigerant from the container without further components having to be fed to the container. In principle, it is thus possible to store the finished refrigerant in the container instead of mixing it in the container by feeding the components. Feeding the components in the container can therefore also be omitted if the finished refrigerant blend or refrigerant is fed to the container.

In one embodiment of the method, the temperature of the completely liquid or gaseous refrigerant can be controlled by means of a temperature control means of the control device. The temperature control means can then be designed such that, depending on the refrigerant blend, the temperature inside the container can be set such that the refrigerant is always exclusively in the liquid or gaseous state and the miscibility gap of the refrigerant is bypassed or avoided.

In a further embodiment of the method, the pressure of the completely liquid or gaseous refrigerant can be controlled by means of a pressure control means of the control device, alone or in addition to temperature control. With the pressure control means, the pressure in an interior of the container can then always be set such that the refrigerant is completely in liquid or gas form in the container. By controlling the pressure, it can also be ensured here that a miscibility gap of the refrigerant is bypassed.

The refrigerant can have a temperature glide of ≥10 K, preferably ≥15 K, particularly preferably ≥18 K. A temperature glide of the refrigerant should not be >20 K, since a cooling means cannot then be operated practically.

The refrigerant can have a relative $CO_2$ equivalent, over 20 years, of <2500, preferably <1500, particularly preferably <500. The refrigerant can therefore have a low environmental impact.

Furthermore, the refrigerant can be non-combustible. If the refrigerant is non-combustible, it is possible to make a cooling circuit and in particular a refrigeration machine more cost-effective, since no particular safety precautions have to be taken with regard to the combustibility of the refrigerant. The refrigerant can then at least not be assigned to fire class C and/or refrigerant safety group A1. Furthermore, dispatching and transporting the cooling circuit is made easier, since the cooling circuit can be filled with the refrigerant before being transported, regardless of the type of transport. With combustible refrigerant, filling may only be possible during commissioning at the installation site. Furthermore, it is possible to use the non-combustible refrigerant with sources of ignition present.

The refrigerant can be designed to be used for a temperature within a temperature range of −60° C. to +180° C., preferably −70° C. to +180° C., particularly preferably −80° C. to +180° C. The refrigerant blend can accordingly be designed such that it can be used within this temperature range in a refrigeration machine, in particular a cooling circuit.

The refrigerant can be formed from a mass fraction of carbon dioxide and a mass fraction of at least one further component. The further component can have a low GWP and be non-combustible or combustible to only a limited extent. The fraction of carbon dioxide must be as low as possible, since the freezing point of the refrigerant blend increases as the mass fraction of carbon dioxide rises, if comparatively low temperatures are to be achieved with a cooling circuit. Carbon dioxide has a freezing temperature or freezing point of −56.6° C., which makes temperatures to −60° C. hardly achievable with a high carbon dioxide concentration.

The device according to the disclosure for providing zeotropic refrigerants, the refrigerant consisting of a refrigerant blend of at least two components, comprises at least two dosing valves and a container to which the components can be added via the dosing valves in the ratio of their respective mass fractions to the refrigerant in order to form the refrigerant blend, wherein the device has a control device by means of which the temperature and/or the pressure in the container can be set such that the refrigerant is present exclusively in the gas phase or exclusively in the liquid phase. For the advantages of the device according to the disclosure, reference is made to the description of the advantages of the method according to the disclosure.

The control device can have a temperature control means and/or a pressure control means. With the temperature control means, it is possible to control the temperature in an interior of the container such that a state of the refrigerant within a miscibility gap of the refrigerant can be excluded. It is also possible, alternatively or additionally, to control the pressure in the interior of the container correspondingly using the pressure control means.

The pressure control means can have a flexible diaphragm which can be situated in an interior of the container, wherein the diaphragm can divide the interior into an accommodation space for accommodating the refrigerant and an equalisation space for accommodating an equalisation gas. The diaphragm can be made of a flexible material or else be designed in the manner of a piston or the like to allow a continuous change in the volume of the accommodation space and the equalisation space by a spatial displacement of the diaphragm. When the volume in the interior of the container changes owing to the removal of the refrigerant from the equalisation space, the diaphragm can follow the change in the volume in the accommodation space and enlarge the accommodation space so far that, for example, a pressure above the vapour pressure of the refrigerant in which the refrigerant is present completely in liquid form is set. During removal of the refrigerant, demixing of the refrigerant cannot take place and a uniform concentration of the components in the refrigerant blend in the container can always be ensured. The ratio between the volume of the accommodation space and that of the equalisation space is in this case always determined by a pressure, and the most complete possible emptying of the container or of the accommodation space can be guaranteed without demixing of the refrigerant. The type, amount and pressure of the equalisation gas can be selected accordingly.

In particular, the equalisation space can be filled with nitrogen. As has been proven, nitrogen or molecular nitrogen can be used as the equalisation gas particularly advantageously in terms of its physical properties.

The pressure control means can have a pressure sensor for measuring the container inner pressure and a pressure equalisation valve connected to the container. The pressure sensor can be attached or connected to the pressure equalisation valve directly or via a control member of the control device. Refrigerant can then be discharged from the container into the environment via the pressure equalisation valve or, for example, fed to the container via a pump, so that the desired container inner pressure can always be set. The pressure sensor can also be integrated in the pressure equalisation valve. Furthermore, the pressure control means can also be designed such that the pressure sensor is positioned spatially independently from the pressure equalisation valve and control takes place by means of control electronics.

The temperature control means can have a temperature sensor for measuring a container inner temperature and a temperature adjustment unit connected to the container and/or situated therein. The temperature adjustment unit can, for example, bear against an outer wall of the container or else be situated inside the container. The temperature adjustment unit can be designed in the manner of a heat exchanger. Furthermore, the temperature adjustment unit can be designed to cool and/or heat the container interior. Cooling of the container interior can be implemented simply by means of a heat exchanger of a cooling circuit of the temperature adjustment unit, and heating can be implemented by means of an electric heating means, for example a heating element. The temperature sensor can be connected to control electronics of the temperature control means or to a control member, via which the temperature adjustment unit is controlled such that a desired container inner temperature is set.

The device can have a pump for conveying components in the container. The pump can then convey a refrigerant blend into the container and form a desired pressure there. The refrigerant blend can be present in a gas phase or a liquid phase when conveyed by the pump.

The device can have an outlet valve for removing the refrigerant from the container. A dosed removal of the refrigerant from the container is then possible via the outlet valve. The outlet valve can, for example, be connected to a further container for transporting the refrigerant or else to a cooling circuit of a refrigeration machine, if the refrigeration machine is to be filled with the refrigerant.

The device can have a storage container with a feed line for each component, wherein a dosing valve and a mass flow sensor can be connected in the feed line for feeding the components to the container. Depending on the number of the components in the refrigerant blend, a storage container can therefore be used for each of the components, to store the respective component. A feed line via which the component can be introduced in the container can be connected to each storage container. To add the components in the desired ratio, the dosing valve and the mass flow sensor are arranged in each feed line. A mass fraction of the component introduced in the container via the dosing valve can be measured and controlled by means of the mass flow sensor. It is also possible for the feed lines to be connected to the container indirectly, so that the components are mixed before the components are introduced into the container, and the refrigerant blend thus formed is introduced into the container via a single feed line.

Furthermore, the feed lines can be connected to a static mixer or to a jet mixer of the device. The feed lines are then joined together upstream of or in the static mixer or the jet mixer; a pump can be arranged downstream in the static mixer or the jet mixer and upstream of the container in a feed line connected to the container. The pump can in particular also be a compressor.

Further advantageous embodiments of the device can be found in the descriptions of the features of the dependent claims referring to method Claim 1.

The refrigeration machine according to the disclosure has a device according to the disclosure. The refrigeration machine can comprise a cooling circuit to which the device is connected. It is thus possible to fill the refrigeration machine or the cooling circuit with the refrigerants, for example.

Preferred embodiments of the disclosure are described in more detail below with reference to the attached drawings.

BRIEF DESCRIPTION OF THE DRAWINGS

In the figures.

DETAILED DESCRIPTION

Figure 1:
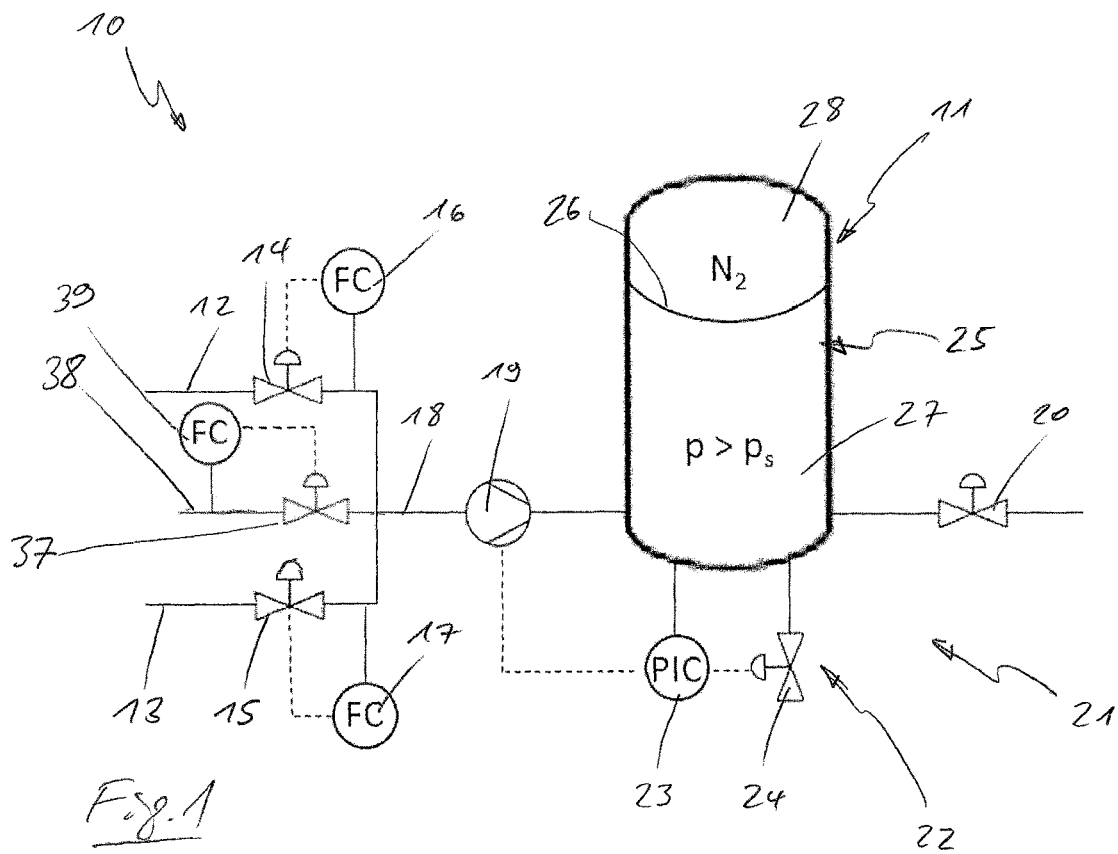
FIG. 1. shows a schematic diagram of a first embodiment of a device.

FIG. 1 shows a device 10 for providing zeotropic refrigerants, the device 10 having a container 11 for producing and storing a refrigerant blend (not visible here) of at least two components. The device 10 further comprises a feed line 12, 13, 38 for each of the components, having dosing valves 14, 15 and 37 and mass flow sensors 16, 17 and 39 arranged in the feed line 12, 13 and 38, respectively. The feed lines 12, 13 and 38 are each connected to a storage container (not shown) for storing the respective component. A mass fraction of the relevant component can be added to the refrigerant in the container 11 via the dosing valves 14, 15 and 37; the dosing valves 14, 15 and 37 can each be controlled by means of the mass flow sensors 16, 17 and 39, respectively.

The feed lines 12, 13 and 38 are joined together in the feed line 18 such that the respective components are mixed in the feed line 18. The feed line 18 is directly connected to the container 11, and in the feed line 18 there is a pump 19 of the device 10, by means of which the refrigerant blend can be introduced into the container 11 under pressure. An outlet valve 20 for removing the refrigerant from the container 11 is also arranged on the container 11. For example, a further container or else a cooling circuit, which can then be filled with the refrigerant, can be connected to the outlet valve 20.

The device 10 also has a control device 21, only part of which is shown here. The control device 21 has a pressure control means 22, which has a pressure sensor 23 for measuring a container inner pressure of the container 11 and a pressure equalisation valve 24 connected to the container 11. Refrigerant can be let out of the container 11 via the pressure equalisation valve 24 to reduce the container inner pressure. Furthermore, the pump 19 can be operated via the pressure sensor 23 when an increase in a container inner pressure or filling of the container 11 is necessary. The pressure control means 22 can have control members and means (not shown here) to operate the pressure equalisation valve 24 and the pump 19.

In this embodiment of the device 10, the pressure control means 22 is designed such that there is in an interior 25 of the container 11 a flexible diaphragm 26 which divides the interior 25 into an accommodation space 27 for accommodating the refrigerant and an equalisation space 28 which is in this case filled with molecular nitrogen. A change in the volume of the accommodation space or a change in fill level caused by the removal of refrigerant from the accommodation space 27 is equalised by a corresponding change in the volume of the equalisation space 28 by means of the diaphragm 26, a pressure above the vapour pressure of the refrigerant always being set in the accommodation space 27 such that the refrigerant is completely present in liquid form, and therefore demixing of the refrigerant is prevented when refrigerant is removed from the container 11.

Figure 2:
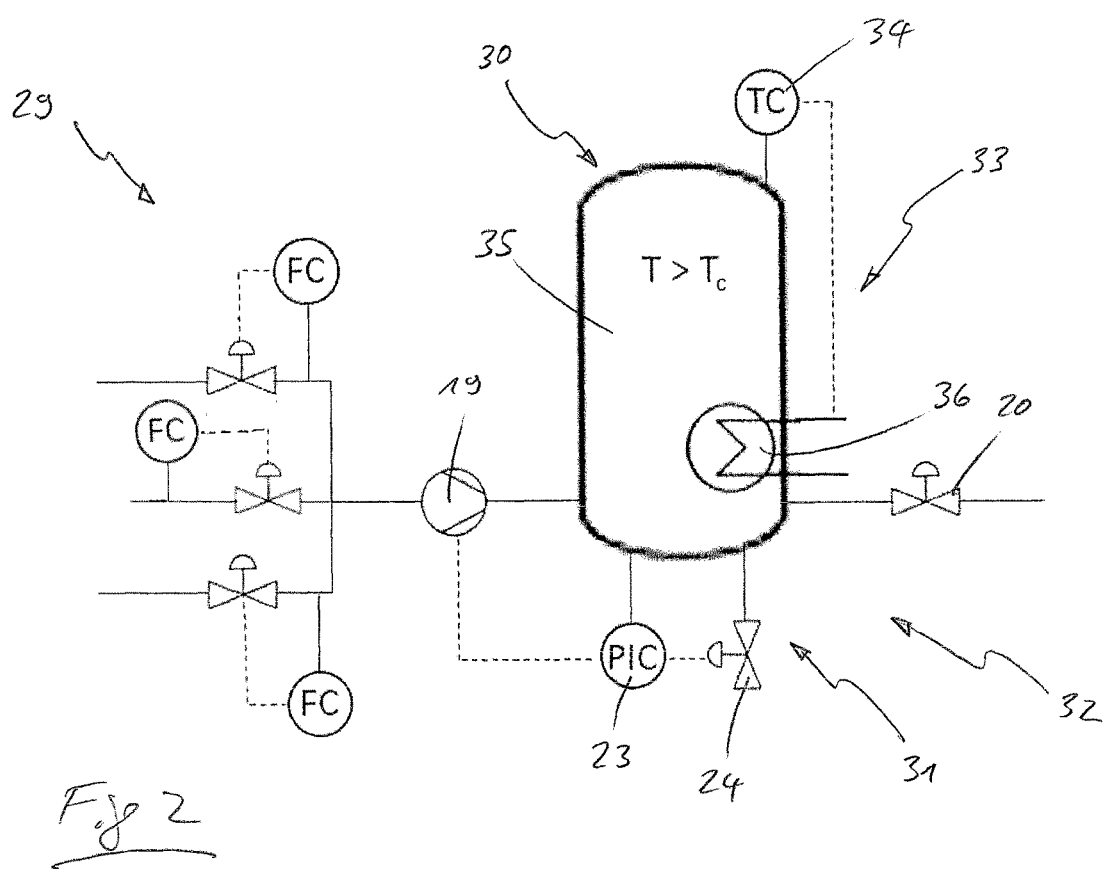
FIG. 2 shows a schematic diagram of a second embodiment of a device.

FIG. 2 shows a further embodiment of a device 29 which, in contrast to the device of FIG. 1, has a container 30 with a pressure control means 31. The pressure control means 31 in this case likewise comprises a pressure sensor 23 and a pressure equalisation valve 24. A control device 32 of the device 29 has a temperature control means 33 in addition to the pressure control means 31. The temperature control means 33 comprises a temperature sensor 34 for measuring the container inner temperature or the temperature of a refrigerant situated in the interior 35 of the container 30 and a temperature adjustment unit 36 arranged in the interior 35. The refrigerant in the interior 35 can be cooled or heated using the temperature adjustment unit 36. The temperature adjustment unit 36 is controlled depending on a measurement value of the temperature sensor 34, so that the temperature of the refrigerant in the interior can always be set such that the refrigerant is present in the interior exclusively in the gas phase. Demixing of the refrigerant when the refrigerant is removed from the container 30 can thus be prevented.

The invention claimed is:

1. A method for providing zeotropic refrigerants in which a refrigerant is formed from a refrigerant blend of at least two components, the components being added to a container in the ratio of their respective mass fractions to the refrigerant, and the refrigerant blend being formed in the container, wherein the temperature in the container is set by a control device such that the refrigerant is present exclusively in a gas phase, wherein the temperature of the completely gaseous refrigerant is controlled by a temperature control of the control device and wherein the concentration of the components remains constant during removal of refrigerant from the container without further components having to be fed to the container.

2. The method according to claim 1, wherein a pressure of the completely gaseous refrigerant is controlled by a pressure control of the control device.

3. The method according to claim 1, wherein the refrigerant has a temperature glide of ≥10 K.

4. The method according to claim 1, wherein the refrigerant has a relative $CO_2$ equivalent, over 20 years, of <2500.

5. The method according to claim 1, wherein the refrigerant is non-combustible.

6. The method according to claim 1, wherein the refrigerant is designed to be used for a temperature within a temperature range of −60° C. to +180° C.

7. The method according to claim 1, wherein the refrigerant is formed from a mass fraction of carbon dioxide ($CO_2$) and a mass fraction of at least one further component.

8. The method of claim 1, wherein the control device is further configured to set a pressure in the container.

9. A device for providing zeotropic refrigerants, a refrigerant consisting of a refrigerant blend of at least two components, the device comprising at least two dosing valves and a container to which the components are added via the dosing valves in the ratio of their respective mass fractions to the refrigerant in order to form the refrigerant blend, wherein the device has a control device configured to set the temperature in the container such that the refrigerant is present exclusively in a gas phase, wherein the temperature of the completely gaseous refrigerant is controlled by a temperature control of the control device and wherein the concentration of the components remains constant during removal of refrigerant from the container without further components having to be fed to the container.

10. The device according to claim 9, wherein the control device has a temperature control and/or a pressure control.

11. The device according to claim 10, wherein the pressure control has a flexible diaphragm which is situated in an interior of the container, wherein the diaphragm divides the interior into an accommodation space for accommodating the refrigerant and an equalisation space for accommodating an equalisation gas.

12. The device according to claim 11, wherein the equalisation space is filled with nitrogen ($N_2$).

13. The device according to claim 10, wherein the pressure control has a pressure sensor for measuring a container inner pressure and a pressure equalisation valve connected to the container.

14. The device according to claim 10, wherein the temperature control has a temperature sensor for measuring a container inner temperature and a temperature adjustment unit connected to the container and/or situated therein.

15. The device according claim 9, wherein the device has a pump for conveying components into the container.

16. The device according to claim 9, wherein the device has an outlet valve for removing the refrigerant from the container.

17. The device according to claim 9, wherein the device has a storage container with a feed line for each component, wherein a dosing valve of the at least two dosing valves and a mass flow sensor are connected in the feed line for feeding the components to the container.

18. The device according to claim 17, wherein the feed lines are connected to a static mixer or a jet mixer of the device.

19. A refrigeration machine having a device according to claim 9.

* * * * *